July 9, 1929. L. PIERCE Re. 17,367

BUILDING PILE FORM

Original Filed June 2, 1927

Inventor

Leon Pierce by Watson, Cole, Morse & Grindle

Attorneys

Reissued July 9, 1929. Re. 17,367

UNITED STATES PATENT OFFICE.

LEON PIERCE, OF NEW YORK, N. Y., ASSIGNOR TO PIERCE STEEL PILE CORPORATION, OF NEW YORK, N. Y., A CORPORATION OF NEW YORK.

BUILDING-PILE FORM.

Original No. 1,645,398, dated October 11, 1927, Serial No. 195,896, filed June 2, 1927. Application for reissue filed June 28, 1928. Serial No. 289,022.

The main object of this invention is to provide a novel type of pile form used in constructing piles for the foundations of buildings, and consists of three sections, a soil penetrator nose, a hole forming sleeve and a series of inner shells, open at both ends into which the cement is poured after the outer hole forming sleeve has been removed or salvaged.

Another object of this invention is to provide a pile form used in the construction of all kinds of buildings which consists of three sections, a penetrator nose, and an inner and outer shell, the inner shell being composed of sections which are adapted to be filled with concrete while the outer shell is adapted to be extracted and salvaged.

The above and other objects will become apparent in the description below in which characters of reference refer to like-named parts in the drawing.

Referring briefly to the drawing, Figure 1 is a longitudinal sectional elevational view of the pile form showing the same in its entirety;

Figure 1:
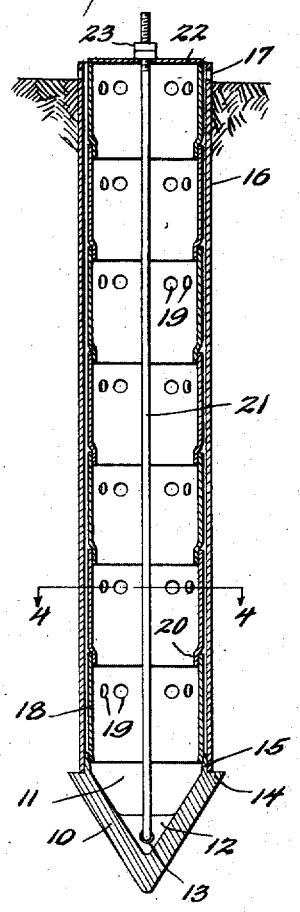

Referring in detail to the drawing, the numeral 10 indicates a conical tapering penetrator nose which is of substantial construction so that it may withstand fracture when coming into contact with stone or other similar hard substance found in the soil. This nose is of hollow construction having an inverted conical chamber 11. A rib 12 extends upwardly and diametrically from the apex of the chamber and this rib is provided with an opening 13 which passes entirely through it from one side to the other. The tip of the nose always hangs in suspended position and is the first to enter or pierce the soil. The upper open portion of the nose is encircled by a flat shoulder 14 which is surmounted by an internal annular rim 15.

The lower end of an outer shell 16 is seated on the shoulder 14 in contact with the rim 15 which latter serves as a positioning member for the outer shell. This shell is of the same length as the distance the pile is to be sunk and is formed of a unitary piece of material of seamless construction. The upper end of the outer shell is provided with a plurality of openings 17 into which tackle is inserted when the shell is to be extracted from the well it has formed.

A plurality of hollow sleeves 18 open at both ends, and of a dimension smaller than the outer shell are slipped into the outer shell after the latter has been sunk to the desired position. The lower ends 20 of these sleeves are formed with a reduced diameter so that the reduced end of one sleeve telescopes partly into the larger end of the sleeve above it. Each sleeve is provided with a series of perforations 19 which are provided at spaced apart positions around the circumference thereof.

The opening 13 on the rib 12 of the penetrator nose receives the lower looped end 24 of a tie rod 21. The tie rod extends axially upward within the sleeves and projects from the upper end of the uppermost sleeve, and the end of the tie rod projecting therefrom is threaded and is adapted to be engaged by a pair of nuts 23. The latter retain an annular face plate 22 in position on the uppermost sleeve. This face plate has an axial opening therein in which the upper end of the tie rod registers.

Figure 2:
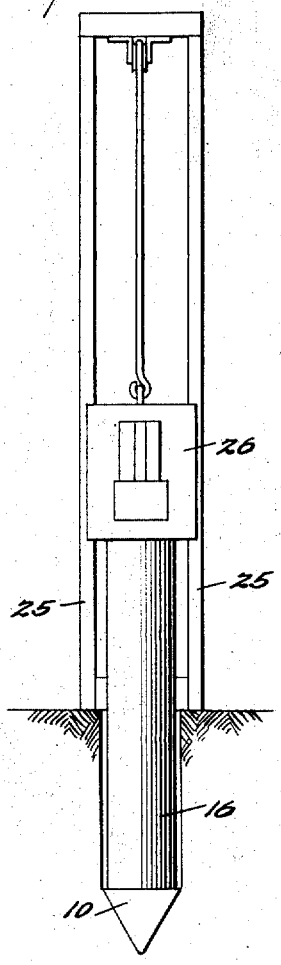
Figure 2 is a reduced front elevational view showing the outer shell and nose of the pile form being sunk into the ground with the aid of a steam hammer.
Figure 3:
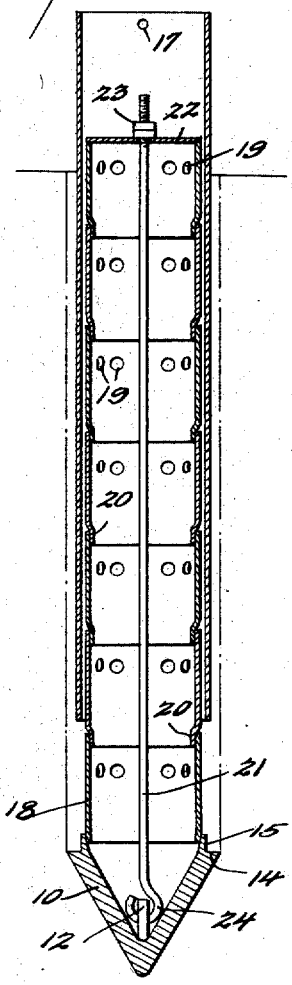
Figure 3 is a longitudinal sectional elevational view of the pile form similar to Figure 1 but showing the outer sleeve partly extracted.
Figure 4:
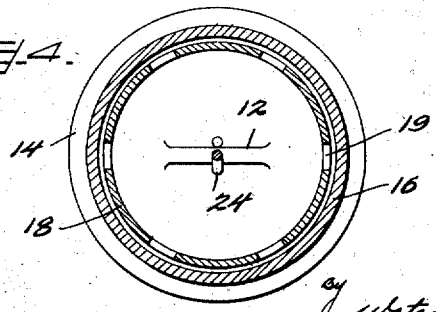
Figure 4 is a cross sectional view of the pile form, the section being taken on line 4—4 of Figure 1.

The construction of the pile form is such that the outer shell 16 is salvaged and may be used over and over again until it is worn out or damaged. The outer shell 16 and the nose 10 are secured to each other through a friction fit, the nose hanging suspended as shown in Figure 2 from the outer shell. This shell and nose are guided into position between the leads 25 of a pile driver. In sinking the nose and shell a steam hammer 26 is seated on the upper end of the outer shell 16 and operation of the hammer causes the nose to penetrate the soil and thereby sink the nose and the outer shell to the desired depth. Before the outer shell 16 is withdrawn from the well which has been formed by the nose, the sleeve sections 18 are inserted into the outer shell one after the adjacent one by slipping the lower reduced end of one section into the larger end of the next lowest section. These sleeves form, in effect, a continuous inner sleeve which receives the cement, as later pointed out. The sleeves are very apt to cling to the outer shell surface and thereby be raised with the outer shell as the latter is being extracted from the well. To prevent the sleeves from being removed from the interior of the outer shell, the face plate 22 is secured in place by passing the upper end of the tie rod, which is threaded, through the axial opening provided in the face plate and then securing the nuts 23 in place in the manner illustrated in Figure 1. After the outer shell 16 has been extracted from the well, an annular void exists between the outer surface of the sleeve sections and the surface of the well. After partly or wholly removing the face plate from the uppermost sleeve, cement is dumped into the sleeve until the pile form has been filled with cement which is poured in through the uppermost sleeve situated at the upper end of the construction. The cement seeps through the perforations 19 which are formed near the upper end of each sleeve section and that cement which passes through these perforations drops into the space between the sleeves and the wall of the well and fills this void so that both sides of the sleeves will be covered by a coating of cement.

It is to be noted that certain changes in form and construction may be made without departing from the spirit and scope of the invention.

Having thus described the invention, what is claimed as new and desired to be secured by Letters Patent is:

1. In a building pile form, a nose, an outer removable shell seated on said nose, a plurality of sleeves arranged end to end in said shell, and means engaging said nose and the uppermost sleeve for securing the sleeves in place while extracting said shell.

2. In a building pile form, a nose, an outer removable shell seated on said nose, a plurality of sleeves open at both ends secured to each other end to end, the lowermost sleeve seating on the nose, and means engaging the nose and the uppermost sleeve for retaining the sleeves in arranged formation while the shell is being removed.

3. In a building pile form, a penetrator nose, a removable shell adapted to rest on said nose and force the same into the earth, a plurality of sleeves arranged in said shell, means for holding said sleeves in alignment, and means engaging said nose and uppermost shell for securing the sleeves in place while extracting said shell.

4. In a building pile form, a nose, a removable shell for driving said nose into the earth, a plurality of sleeves arranged in said shell, means for holding said sleeves in alignment, and means for anchoring said sleeves to said nose while removing the shell.

5. In a building pile form, a nose having a shoulder thereon, an internal encircling rim on said nose, an outer shell having its lower end seated on said shoulder in contact with the encircling rim, a plurality of sleeves connected end to end adapted to be slipped into said shell after the ground has been pierced, the lowermost sleeve seating on the rim of said nose, said nose having a diametral rib formed therein, said rib having an opening, and means engaging in the opening in the rib and the uppermost sleeve for securely retaining the sleeves intact with the nose while the outer sleeve is being extracted.

6. In a building pile form, a nose having a shoulder thereon, an internal encircling rim on said nose, an outer shell having its lower end seated on said shoulder and in contact with the encircling rim, a rib extending upwardly in said nose having an opening therein, a plurality of sleeves secured to each other end to end and having perforations therein, the lowermost sleeve being seated on the rim of said nose, a face plate seated on the uppermost sleeve, a tie rod engaged in the opening of said rib extending axially upward having a threaded upper end, and nuts engaging the threaded end for securing the face plate in seated position on the uppermost sleeve to retain the sleeves mounted on the nose.

In testimony whereof, I hereunto affix my signature.

LEON PIERCE.